United States Patent Office 3,414,624
Patented Dec. 3, 1968

3,414,624
ALKALI METALATED TERTIARY PHOSPHINES AND THE PREPARATION THEREOF
Donald J. Peterson, Springfield Township, Hamilton County, and Hugh R. Hays, Colerain Township, Hamilton County, Ohio, assignors to The Procter & Gamble Company, Cincinnati, Ohio, a corporation of Ohio
No Drawing. Continuation-in-part of application Ser. No. 478,480, Aug. 9, 1965. This application Mar. 1, 1967, Ser. No. 619,548
13 Claims. (Cl. 260—606.5)

ABSTRACT OF THE DISCLOSURE

Tertiary phosphines of the form $RR'PCH_3$ are metalated at the methyl position by organometallic compounds of the form $R''M$. R, R' and R'' can be alkyl or aryl, and M can be sodium, potassium or lithium.

CROSS-REFERENCE TO RELATED APPLICATION

This application is a continuation-in-part of United States patent application Ser. No. 478,480, filed Aug. 9, 1965, and now abandoned.

BACKGROUND OF THE INVENTION

This invention relates to the preparation of a new and useful class of organophosphorus compounds. More specifically, it relates to metalated methyl organophosphines having the general formula $RR'PCH_2M$, where R and R' are alkyl or aryl, and M is a metal, all to be hereinafter more fully described, and to a method of preparing this new class of compounds.

Certainly one of the most rapidly developing areas in the science of chemistry, and potentially one of the most important, is the area of organophosphorus chemistry. The emergence of new tools of investigation, particularly in the analytical field, has served as a springboard for the development of new organophosphorus materials and for their introduction into areas which are both new and old to phosphorus compounds. Particular impact has been felt in the areas of surface active and polymeric materials.

One of the most serious obstacles which is faced by the manufacturer, and particularly the scientist, in the field of organophosphorus chemistry today is the limited number and usefulness of the starting materials and intermediates which are presently available. Two of the most commonly used intermediates at the present time are the phosphorus ylids ($R_3P^{\oplus}$—$CH_2^{\ominus}$) and certain metalated phosphine oxides having a characteristic phosphinyl carbanion structure, such as

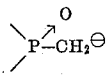

Their primary shortcoming as starting materials and intermediates is readily apparent to one versed in the art. Both contain a tetravalent (completely substituted) phosphorus atom, which means that the reactions in which these compounds can take part are limited to those which occur at the carbanionic center, i.e., on the negatively charged carbon atoms. Expressed in another way, a substituent generally can be added on the carbon atom only, since the bonding capacity of the ylids and phosphinyl carbanions is reached at that point.

It is therefore an object of this invention to present a new and useful class of organophosphorus compounds, and a method for their preparation.

It is another object of this invention to present a class of metalated tertiary methylphosphines which, because of the presence therein of a trivalent phosphorus atom, possess high versatility and usefulness as starting materials and intermediates in the preparation of carbon-functionally substituted organophosphines and derivatives thereof.

Further objects and advantages of this invention will become apparent from the following description and claims.

SUMMARY OF THE INVENTION AND DESCRIPTION OF PREFERRED EMBODIMENTS (a) The process It has now been found that a tertiary phosphine of the form $RR'PCH_3$, in which R and R' are each a hydrocarbon group selected from the group consisting of alkyl and aryl hydrocarbon groups, said hydrocarbon groups containing from one to about twenty two carbon atoms each, the total of said carbon atoms being less than about thirty six, can be reacted with an organic metalating agent of the form $R''M$, where M is selected from the group consisting of sodium, potassium and lithium, to produce a metalated organophosphine, $RR'PCH_2M$, in accord with the following equation:

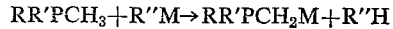

$$RR'PCH_3 + R''M \rightarrow RR'PCH_2M + R''H$$

An amount of organic metalating agent should be used which is sufficient to react with all the tertiary phosphine present. Therefore, the ratio of organic metalating agent to tertiary phosphine should be at least 1:1, and a slight excess of organic metalating agent is desirable. Whereas there is no critical upper limit for the ratio of organic metalating agent to tertiary phosphine, little or no benefit is obtained by using a ratio greater than about 3:1. The preferred ratio of organic metalating agent to tertiary phosphine is from about 1.1:1.0 to about 1.5:1.0.

The nature of the organic portion (R'') of the organic metalating agent in the above equation is not a limitation upon this invention. A large number of organometallic compounds with the general form $R''M$ can be prepared and used in the process of this invention. Whereas certain organometallics of this type will be less reactive than others, all will perform acceptably when used in the above reaction. Mixtures of metalating agents can be used if desired.

As a practical limit however, certain classes of organometallic compounds are more easily and more economically prepared than others. The most common and most reactive organometallics of the form $R''M$, and therefore those which comprise the preferred embodiment of this invention, are those in which R'' is phenyl or a $C_1$ to about $C_8$ alkyl chain. The alkyl chain can be either straight or branched.

As indicated above, the hydrocarbon groups of the tertiary phosphine, R and R', can be alkyl or aryl, the hydrocarbon groups containing from one to about twenty-two carbon atoms each. Examples of typical aryl groups are phenyl, biphenyl and naphthyl groups. The alkyl groups can be straight chain or branched, and typical examples are methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, undecyl, n-dodecyl, tridecyl, n-tetradecyl, pentadecyl, n-hexadecyl, n-octodecyl, eicosyl, docosyl, cyclopentyl, cyclohexyl, cyclohexylmethyl, methylcyclohexyl, 2-cyclohexyldodecyl, 12-cyclohexyldodecyl and 4-dodecylclohexyl. However, aryl alkyl groups, such as benzyl, 2-phenyldodecyl and napthylmethyl groups, are unacceptable for purposes of this invention because the metalation of the phosphine, or a large portion thereof, will occur on the aryl alkyl group rather than on the methyl group as desired.

The R and R' groups can contain any substituents which are not subject to reaction with the organic metalating agent under the reaction conditions chosen. For example, R and R' cannot have a benzhydryl substituent, for metalation would preferentially occur on the benzhydryl group rather than at the methyl group.

The tertiary phosphines and the organic metalating agents disclosed herein react in an acceptable manner when mixed in their pure states. However, it is highly preferred that the reaction be performed in an inert organic solvent. One reason for the use of the solvent is that the organic metalating agents are generally produced and stored in organic solvents, most commonly saturated hydrocarbon solvents. Separation and purification is time-consuming and expensive. Further, the presence of the organic solvent is desirable because it makes the reaction mixture more fluid and promotes intimate contact of the reactants. As a result, separation of the organic solvent from the organic metalating agent is unnecessary and highly undesirable.

Acceptable organic solvents for use in the inventive process are found in such classes as the saturated hydrocarbons, ethers, trialkyl amines and N,N,N',N'-tetraalkyl diamines, particularly those having the form

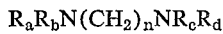

where $n=1$, 2 or 3 and $R_{a-d}$, inclusive, are saturated alkyl radicals having from one to about twenty-two carbon atoms, either straight chain or branched. Preferably $R_{a-d}$, inclusive, are straight chain alkyl radicals having from one to about eight carbon atoms, and most preferably are selected from the group consisting of methyl and ethyl radicals and mixtures thereof.

Examples of hydrocarbon solvents which are acceptable for use in the process of this invention include pentane, hexane, heptane, etc., ligroin, "Stoddard" solvent, cyclohexane and decahydronaphthalene. Examples of suitable ether solvents are diethyl ether, dibutyl ether, tetrahydrofuran, 1,2-dimethoxyethane, diethylene glycol dimethyl ether and bis(2-methoxyethyl)ether. Typical examples of acceptable trialkylamine solvents are triethylamine, tributylamine, N-methyl-diethylamine and 1,4-diazobicyclo[2,2,2]octane. Examples of suitable diamine solvents are N,N,N',N'-tetramethylethylene diamine, N,N,N',N'-tetraethylmethylenediamine and N,N'-dimethyl-N,N'-diethylethylenediamine.

The choice of the organic solvent for use in the reaction of this invention should in large part be based upon the particular organic metalating agent which is used in the reaction. It has been found that ethers and tetraalkyl diamines of the form $R_aR_bN(CH_2)_nNR_cR_d$, as defined above, form complexes with and activate some of the organic metalating agents disclosed herein, particularly the primary and secondary organolithium compounds. This activation is particularly apparent in the above defined diamines, where the activation has been found to be orders of magnitude greater than with the ethers. The apparent reason for the extreme activation provided by this limited class of compounds is that an extremely reactive "ring complex" is formed which involves bonding between the metallic portion of the organic metalating agent and the two nitrogen atoms of the diamine. The diminished tendency to form "ring complexes" which involve other than four to six atoms explains the limited number of diamines which satisfactorily perform this function.

As a result of this activation provided by ethers and particularly by the above defined diamines, these solvents should be used when possible in order to increase the speed of the metalation reaction. However, these solvents tend to react with the more reactive metalating agents disclosed herein, such as tertiary butyl lithium, phenyl and alkyl sodium and phenyl and alkyl potassium; therefore, the ethers and the above defined diamines should not be used in conjunction with these more reactive metalating agents. In fact, the only metalating agents which can be used successfully with the above defined class of diamines are the primary and secondary alkyl lithiums. However, the reactivity of this combination is vastly superior to all other combinations of solvent and organic metalating agent, and therefore forms a preferred combination for use in the reaction disclosed herein. The preferred metalating agent for use in this combination is a $C_1$ to $C_8$ normal alkyl, and, particularly, normal butyl lithium.

The benefit of the activation provided by the ethers and the diamines defined above can be obtained by using the ether and/or diamine in another suitable solvent. For example, if the organic metalating agent, as purchased, is dissolved in a saturated hydrocarbon solvent, the ether or the diamine can be added to the hydrocarbon-metalating agent mixture, and substantial "activation" of the metalating agent will result.

The time required to obtain the maximum yield of metalated methyl organophosphine varies considerably with the nature of the reactants chosen. When the tetraalkyl diamine-alkyl lithium combination described above is used in the metalation reaction, the optimum reaction time can be as short as about one hour. In no other case should the reaction time be less than about 10 to 12 hours. Shorter times than indicated above will result in comparatively poor yields, even when the most reactive of the starting materials are used. At the other extreme, it is often necessary to allow the reaction to proceed for a considerable number of days to reach the maximum yield of the desired product. However, no combination of reactants has yet been found which requires a reaction time of more than about 14 days to give an acceptable yield, and the vast majority of those actually tried required seven days or less.

In the situation where no solvent is used, or where the solvent used does not activate the metalating agent, a somewhat shorter reaction time is obtained when one of the more reactive organic metalating agents is used. The preferred organic metalating agents for this purpose are tertiary butyl lithium, alkyl potassium and alkyl sodium, the alkyl chain being either straight or branched and having from one to about eight carbon atoms.

Since the metalation reaction as described above proceeds quite slowly in many cases, the reaction temperature should be at least 15° C. in order to prevent an undue lengthening of the time required to reach the desired degree of completion. The reaction speed increases with increasing temperature, and the use of temperatures higher than 15° C. is preferable. The upper temperature for the reaction must not exceed about 125° C. and must be below the temperature at which the rate of decomposition of the organic metalating agent becomes significant, i.e., that temperature at which less than about fifty percent of the organic metalating agent will decompose during the course of the reaction. For example, when normal butyl lithium is used as the metalating agent, the reaction temperature must be below about 100° C. because the decomposition rate of normal butyl lithium becomes too rapid above that temperature. The preferred temperature range is from about 20° C. to about 60° C.

The reaciton mixture should be maintained in a vessel under a non-oxidizing atmosphere because the reactants and products herein disclosed tend to oxidize rather rapidly. Typical examples of gases which can be used to form such a non-oxidizing atmosphere are argon, nitrogen and krypton.

(b) The novel compounds

When practiced in accord with the teachings presented above, the process of this invention produces the previously unknown metalated methyl organophosphines of the form $RR'PCH_2M$ wherein R and R' are each a hydrocarbon group selected from the group consisting of alkyl and aryl hydrocarbon groups, said hydrocarbon groups containing from one to about twenty two carbon atoms each, the total of said carbon atoms being less than about thirty six, and M is selected from the group consisting of sodium, potassium and lithium.

These metalated methyl organophosphines possess the highly reactive phosphino carbanion structure,

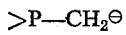

Unlike the tetravalent phosphorus substituted carbanions of the prior art discussed above, the phosphino carbanion possesses *two* reactive centers, the trivalent phosphorus atom and the negatively charged carbon atom adjacent thereto. As a result of this greater availability of reactive centers and the high reactivity of this type of compound, an extremely useful and versatile class of organophosphorus materials is made available. The compounds of this invention thus have the capacity and the capability of taking part in two successive chemical reactions and, in this manner, producing in comparatively high yields and with relative simplicity a large number of compounds with a combination of functional groups; such compounds have utility in a large number of applications including, inter alia, surface active materials, herbicides and lubricant additives. Compounds of this nature could heretofore be prepared, if at all, only with a great deal of time and difficulty, since the process would generally involve the difficult reduction of the tetravalent phosphorus atom to the trivalent state.

A particularly preferable class of metalated methyl phosphines is obtained when R is methyl and R' is an alkyl chain having from about 8 to about 18 carbon atoms. The presence of that particular alkyl chain in these compounds makes them particularly useful in the preparation of surface active materials. Typical examples of such preferred compounds are dodecylmethylphosphinomethyl lithium, dodecylmethylphosphinomethyl sodium, tetradecylmethylphosphinomethyl lithium, tetradecylmethylphosphinomethyl sodium, hexadecylmethylphosphinomethyl lithium and hexadecylmethylphosphinomethyl sodium.

Similarly, particularly preferred embodiments of this invention are obtained when R and R' are hydrocarbon radicals selected from the group consisting of phenyl and methyl radicals, i.e., dimethylphosphinomethyl lithium, diphenylphosphinomethyl lithium and methylphenylphosphinomethyl lithium, and the sodium and potassium counterparts to these lithium compounds. This group of metalated methylphosphines finds particular utility in the preparation of herbicides and/or lubricant additives.

EXAMPLES

The following examples are given to demonstrate the preparation of the metalated methyl organophosphines of this invention, and the use of these compounds in the preparation of other organophosphorus materials. However, these examples are not intended to be limitations upon the scope of this invention.

Example 1

A 180 ml. cylindrical glass tube was connected to an argon source by means of a flexible rubber tube. The air was purged from the tube and an argon atmosphere was maintained. Using a calibrated syringe, 40 ml. of hexane, 0.05 gm.-mole dimethylphenyl phosphine $$[(C_6H_5)P(CH_3)_2]$$

and 0.07 gm.-mole tertiary butyl lithium, $t-C_4H_9Li$, were added to the tube. The mixture was gently stirred by means of a magnetic stirrer for 48 hours. The temperature was maintained at about 25° C. A yellow precipitate of $(C_6H_5)(CH_3)PCH_2Li$, one of the novel compounds of this invention, formed during the course of the reaction.

This metalated product was then converted to (carboxymethyl)methylphenylphosphine sulfide,

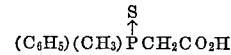

a useful herbicide, in the following manner. The flexible tube was clamped shut, removed from the argon source, and attached to one neck of a three-neck flask which contained 75 ml. hexane and an excess of Dry Ice. The second neck of the three-necked flask was attached to the argon source and a loosely fitted glass stopper in the third neck was used as a gas release valve. When the purging of the air from the flask by the $CO_2$ evolution was completed, the mixture containing the metalated methyl organophosphine was added slowly to the Dry Ice mixture via the flexible rubber tube. The following reaction took place:

The remaining Dry Ice was allowed to vaporize, a small argon flow was introduced, and then 0.20 gm.-mole of elemental sulfur was introduced through the third neck of the flask in four portions. The mixture was agitated gently for about 30 minutes to allow complete sulfurization of the phosphines to take place; then 100 ml. of water were added and the argon flow turned off. The aqueous layer was separated, acidified with hydrochloric acid and extracted with several portions of diethyl ether. The (carboxymethyl)methylphenylphosphine sulfide was recovered by distilling off the ether, and then purified by crystallization from a benzene-hexane mixture. The over-all yield was about 45%.

When, in the above example, reaction temperatures of 15° C., 40° C. and 60° C. are employed instead of the 25° C. reaction temperature; and/or reaction times of twelve hours, four days and seven days are employed instead of the 48 hour reaction time; and/or pentane, heptane, ligroin, "Stoddard" solvent, cyclohexane, decahydronaphthalene, triethylamine, tributylamine, N-methyldiethylamine or mixtures thereof are substituted in whole or in part for the hexane, substantially similar results are obtained in that a substantial amount of $(C_6H_5)CH_3PCH_2Li$ is produced.

Example 2

Using the same process and amounts of reactants as described in Example 1, dimethyldodecylphosphine $[C_{12}H_{25}P(CH_3)_2]$ was reacted with tertiary butyl lithium, $t-C_4H_9Li$. The reaction solvent used was hexane, the reaction temperature was about 25° C., and the reaction time was about 96 hours. The reaction product was $(C_{12}H_{25})(CH_3)PCH_2Li$, one of the novel compounds of this invention.

This metalated product was then carbonated with Dry Ice in a hexane solvent to form

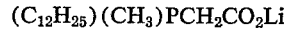

using the same procedure as in Example 1. Following the complete vaporization of the Dry Ice, 0.15 gm.-mole of hydrogen peroxide was added to the flask to oxidize the substituted phosphine to α-(lithiocarboxymethyl) dodecylmethylphosphine oxide,

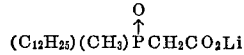

a useful dry cleaning agent. An overall yield of about 50% was attained.

When, in the above example, the tertiary butyl lithium is replaced in whole or in part by equivalent amounts of phenyl sodium, phenyl potassium, a $C_1$, $C_2$, $C_3$, $C_4$, $C_5$, $C_6$, $C_7$ or $C_8$ alkyl sodium, a $C_1$, $C_2$, $C_3$, $C_4$, $C_5$, $C_6$, $C_7$ or $C_8$ alkyl potassium, or mixtures thereof, substantially similar results are obtained in that a substantial amount of $(C_{12}H_{25})(CH_3)PCH_2M$ is produced, "M" being sodium, potassium, lithium or mixtures thereof, depending upon the particular organic metalating agent or mixtures of organic metalating agents chosen.

Example 3

Using the same process as described in Example 1, di-n-hexylmethylphosphine $[(C_6H_{13})_2P(CH_3)]$ is reacted with phenyl lithium $(C_6H_5Li)$. The reaction solvent is diethyl ether, the reaction temperature is about 40° C., and the reaction time is about 114 hours. The reaction product is $(C_6H_{13})_2PCH_2Li$. This product is then converted to di-n-hexyl(trimethylsilylmethyl)phosphine sulfide

a useful lubricant additive, as follows. The reaction product described above is added, under an argon atmosphere, to a three-necked flask which contains a mixture of pentane and 0.10 gm.-mole of trimethylchlorosilane $[(CH_3)_3SiCl]$. The metalated phosphine and the trimethylchlorosilane react to form $$(C_6H_{13})_2PCH_2Si(CH_3)_3$$

Sulfurization and purification as described in Example 1 are performed to produce the final product. An over-all yield of about 30% is attained.

When, in the above example, dibutyl ether, tetrahydrofuran, 1,2-dimethoxyethane, diethylene glycol dimethyl ether, bis(2-methoxyethane)ether or mixtures thereof are substituted in whole or in part for the diethyl ether, and/or the phenyl lithium is replaced in whole or in part by a $C_1$, $C_2$, $C_3$, $C_4$, $C_5$, $C_6$, $C_7$ or $C_8$ alkyl lithium other than tertiary butyl lithium, or mixtures thereof, substantially similar results are obtained in that a substantial amount of $(C_6H_{13})_2PCH_2Li$ is produced.

Similarly, when in the above example, one or both of the n-hexyl groups of the tertiary phosphine starting material are replaced by phenyl, biphenyl, naphthyl, methyl, ethyl, n-propyl, isopropyl, n-butyl, isobutyl, n-pentyl, isopentyl, n-heptyl, n-octyl, isooctyl, 2-ethylhexyl, diisobutyl, n-nonyl, tripropylene, n-decyl, n-dodecyl, tridecyl, n-tetradecyl, pentadecyl, n-hexadecyl, n-octadecyl, eicosyl, docosyl, cyclopentyl, cyclohexyl, cyclohexylmethyl, methylcyclohexyl, 2-cyclohexyldodecyl, 12-cyclohexyldodecyl or 4-dodecylcyclohexyl groups or a combination thereof, wherein the total of the carbon atoms in such groups is less than about thirty-six, substantially similar results are obtained in that a substantial amount of $RR'PCH_2Li$ is produced, R and R' being the specific organic groups chosen.

Example 4

A 50 ml. round bottom flask was connected to an argon source by means of a flexible rubber tube. The air was purged from the flask and an argon atmosphere was maintained. Using a calibrated syringe, 13 ml. of hexane, 0.02 gm.-mole normal butyl lithium, 0.02 gm.-mole N,N,N',N'-tetramethylethylenediamine, and 0.02 gm.-mole diphenylmethylphosphine were added to the flask. The temperature of the reaction mixture was maintained at 25° C. and gentle agitation was provided by means of a magnetic stirrer.

After about one-quarter hour, a yellow precipitate of diphenylphosphinomethyl lithium, $(C_6H_5)_2PCH_2Li$, one of the novel compounds of this invention was observed. The reaction was allowed to continue to provide a total reaction time of one hour.

The metalated product then was converted to (carboxymethyl) diphenylphosphine sulfide

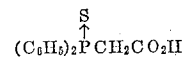

a useful herbicide, in the following manner. The flexible tube was clamped shut, removed from the argon source, and attached to one neck of a three-necked flask which contained 75 ml. hexane and an excess of Dry Ice. The second neck of the three-necked flask was attached to the argon source and a loosely fitted glass stopper in the third neck was used as a gas release valve. When the purging of the air from the flask by the $CO_2$ evolution was completed, the mixture containing the metalated methyl organophosphine was added slowly to the Dry Ice mixture via the flexible rubber tube. The following reaction took place:

$$(C_6H_5)(CH_3)PCH_2Li + CO_2 \rightarrow (C_6H_5)(CH_3)PCH_2CO_2Li$$

The remaining Dry Ice was allowed to vaporize, a small argon flow was introduced, and then 0.20 gm.-mole of elemental sulfur was introduced through the third neck of the flask in four portions. The mixture was agitated gently for about 30 minutes to allow complete sulfurization of the phosphine to take place; then 100 ml. of water were added and the argon flow turned off. The aqueous layer was separated, acidified with hydrochloric acid and extracted with several portions of diethyl ether. The (carboxymethyl)methylphenylphosphine sulfide was recovered by distilling off the ether, and then purified by crystallization from a benzene-hexane mixture. The over-all yield was about 70%.

All compounds prepared as described in the above examples have utility as intermediates in the preparation of surface active materials, herbicides and/or lubricant additives by reactions similar to those disclosed herein.

We claim:
1. A compound with the general formula $RR'PCH_2M$ wherein R and R' are each a hydrocarbon group selected from the group consisting of alkyl and aryl hydrocarbon groups, said hydrocarbon groups containing from one to about twenty-two carbon atoms each, the total of said carbon atoms being less than about thirty-six, and M is selected from the group consisting of sodium, potassium and lithium.
2. Dodecylmethylphosphinomethyl lithium.
3. Dodecylmethylphosphinomethyl sodium.
4. Dimethylphosphinomethyl lithium.
5. Diphenylphosphinomethyl lithium.
6. Methylphenylphosphinomethyl lithium.
7. A process for metalating a tertiary phosphine of the form $RR'PCH_3$ wherein R and R' are each a hydrocarbon group selected from the group consisting of alkyl and aryl hydrocarbon groups, said hydrocarbon group containing from one to about twenty-two carbon atoms each, the total of said carbon atoms being less than about thirty-six, which comprises reacting said tertiary phosphine with an organic metalating agent of the form R"M, wherein M is selected from the group consisting of sodium, potassium and lithium, for a time of from about one hour to about 14 days, at a temperature of from about 15° C. to about 125° C. and below the temperature at which less than about fifty percent of the organic metalating agent will decompose during the course of the reaction.
8. The process of claim 7 wherein the metalating agent is selected from the group consisting of tertiary butyl lithium, $C_1$ to $C_8$ alkyl sodium and $C_1$ to $C_8$ alkyl potassium.
9. The process of claim 7 wherein the reaction temperature is from about 20° C. to about 60° C.
10. The process of claim 7 wherein the reaction between the tertiary phosphine and the organic metalating agent takes place in an inert organic solvent.

11. The process of claim 10 wherein the organic solvent is a tetraalkyldiamine having the form $$R_aR_bN(CH_2)_nNR_cR_d$$

where $n=1$, 2 or 3 and $R_{a-d}$, inclusive, are saturated alkyl radicals having from one to about twenty-two carbon atoms, and the organic metalating agent is a primary or secondary alkyl lithium, the alkyl having from about one to about eight carbon atoms.

12. The process of claim 11 wherein the organic metalating agent is normal butyl lithium.

13. The process of claim 11 wherein the organic solvent is N,N,N',N'-tetramethylethylenediamine.

References Cited

UNITED STATES PATENTS

| 2,803,597 | 8/1957 | Stiles et al. | 260—606.5 X |
| 2,959,621 | 11/1960 | Niebergall | 260—606.5 |
| 2,964,550 | 12/1960 | Seyferth | 260—606.5 X |

OTHER REFERENCES

R.C.K.F.: Chem. Abstracts, vol. 63, 1965, p. 2997.

TOBIAS E. LEVOW, *Primary Examiner.*

W. F. W. BELLAMY, *Assistant Examiner.*